(12) United States Patent
Appleyard

(10) Patent No.: US 7,275,767 B2
(45) Date of Patent: Oct. 2, 2007

(54) STEERING COLUMN ASSEMBLY

(75) Inventor: Michael Appleyard, Cheltenham (GB)

(73) Assignee: TRW Lucas Varity Electric Steering Limited, Solihull, West Midlands (GB)

(*) Notice: Subject to any disclaimer, the term of this patent is extended or adjusted under 35 U.S.C. 154(b) by 324 days.

(21) Appl. No.: 11/010,832

(22) Filed: Dec. 13, 2004

(65) Prior Publication Data

US 2005/0156423 A1 Jul. 21, 2005

(30) Foreign Application Priority Data

Dec. 11, 2003 (GB) ................................ 0328695.2

(51) Int. Cl.
*B62D 1/00* (2006.01)

(52) U.S. Cl. ..................................... 280/777

(58) Field of Classification Search ................ 280/777, 280/779, 780, 775, 492, 493
See application file for complete search history.

(56) References Cited

U.S. PATENT DOCUMENTS

| | | | | |
|---|---|---|---|---|
| 5,235,734 A | * | 8/1993 | DuRocher et al. | 29/455.1 |
| 5,267,480 A | * | 12/1993 | Krizan | 74/493 |
| 5,477,750 A | * | 12/1995 | Korzan | 74/579 R |
| 5,685,565 A | * | 11/1997 | Schafer et al. | 280/777 |
| 5,722,300 A | * | 3/1998 | Burkhard et al. | 74/493 |
| 6,099,036 A | * | 8/2000 | Fujiu et al. | 280/777 |
| 6,354,626 B1 | * | 3/2002 | Cartwright | 280/777 |
| 6,557,433 B1 | * | 5/2003 | Castellon | 74/492 |
| 6,729,648 B2 | * | 5/2004 | Ulintz | 280/777 |
| 6,848,334 B2 | * | 2/2005 | Kluemper et al. | 74/492 |
| 7,066,491 B2 | * | 6/2006 | Kittler et al. | 280/777 |
| 2002/0079686 A1 | * | 6/2002 | Kondou et al. | 280/777 |
| 2002/0088296 A1 | * | 7/2002 | Schroter et al. | 74/492 |
| 2004/0104567 A1 | * | 6/2004 | Kinme et al. | 280/777 |
| 2006/0001249 A1 | * | 1/2006 | Fargeas et al. | 280/777 |
| 2006/0125224 A1 | * | 6/2006 | Higashino et al. | 280/777 |
| 2006/0290129 A1 | * | 12/2006 | Inayoshi et al. | 280/777 |

FOREIGN PATENT DOCUMENTS

| | | |
|---|---|---|
| EP | 0 936 130 | 8/1999 |
| GB | 1075329 | 7/1967 |
| GB | 1 369 188 | 10/1974 |
| GB | 1 465 039 | 2/1977 |
| GB | 2 273 969 | 7/1994 |

* cited by examiner

*Primary Examiner*—Paul N. Dickson
*Assistant Examiner*—Drew J. Brown
(74) *Attorney, Agent, or Firm*—MacMillan, Sobanski & Todd, LLC

(57) ABSTRACT

A collapsible steering column assembly comprises: an upper column portion; an intermediate column portion; and a lower column portion. The upper portion is telescopically connected to the intermediate portion and the intermediate portion in turn is telescopically connected to the lower portion to define a column having a first length when in an extended position and a second length when in a collapsed position, the first length being greater than the second length.

20 Claims, 3 Drawing Sheets

STEERING COLUMN ASSEMBLY

CROSS REFERENCE TO RELATED APPLICATION

This application claims priority to United Kingdom Application No. 0328695.2 filed Dec. 11, 2003, the disclosures of which are incorporated herein by reference.

BACKGROUND OF THE INVENTION

This invention relates to improvements in steering column assemblies. It in particular relates to steering columns which form part of an electrically power assisted steering system.

A steering assembly typically comprises a steering shaft which connects a steering wheel to a pair of road wheels. A portion of the shaft is located within the driving compartment of the vehicle and is supported within a steering column by one or more bearings. The steering column and the shaft are usually designed so that they will collapse in the event of an accident in which the weight of a driver is applied to the steering wheel. This allows the wheel to move away from the driver, reducing the loading on the driver The column is typically made in two tubular sections which collapse by one part sliding over the other.

With the introduction of electrically assisted power steering systems in which an electric motor is used to apply an assistance torque to the steering shaft, it is often found that a relatively high proportion of the steering shafts length is taken up by the motor or its associated components such as a gearbox and its housing. This reduces the length of steering column that can be permitted to collapse. Most vehicle manufacturers today specify that the minimum acceptable collapse is 100 mm, yet also place limitations on the total length of the steering column of between 480 and 580 mm.

In addition to the requirement for collapse a steering column must also be able to pass an offset crash test set out in regulatory procedures. To avoid excess friction between the two overlapping parts a minimum overlap should be provided. If too short the tubes may bind. Most manufacturers again specify a minimum overlap to enable the column to pass such a test.

Using a steering column with two tubes that has a minimum overlap of 100 nm and a collapse of 100 mm requires 300 mm of the overall shaft length to be committed to the collapse function. For a steering column shaft at the shorter end of a manufacturers range this may only leave a small amount of room for the EPAS device and the steering wheel. In many cases there is not enough room to meet these requirements.

It is therefore an object of the invention to provide a steering column assembly which provides for a relatively high collapse travel from a relatively short column length.

SUMMARY OF THE INVENTION

According to a first aspect the invention provides a collapsible steering column assembly which comprises:
an upper column portion;
an intermediate column portion; and
a lower column portion;
the upper portion being telescopically connected to the intermediate portion and the intermediate portion in turn being telescopically connected to the lower portion to define a column having a first length when in an extended position and a second length when in a collapsed position, the first length being greater than the second length.

The upper portion may slide relative to the intermediate portion and the intermediate portion may slide relative to the lower portion on movement of the assembly between the extended position and the collapsed position.

The invention therefore provides for a column which includes at least three telescoping portions that slide over one another during collapse. This permits more collapse travel for a given length of column than a prior art arrangement in which only an upper and a lower portion are provided.

The lower portion may be connected to the intermediate portion through a low friction engagement. This may be provided by a plastic part such as a slide bush located between them, or providing one or both parts with a low friction coating.

By contrast, the intermediate portion may be a press fit to the upper portion. This provides a greater friction than the connection between the lower portion and the intermediate portion such that on initial movement between the extended and collapsed positions the lower portion telescopes relative to the intermediate portion whilst the intermediate portion remains substantially fixed relative to the upper portion.

Of course, some other arrangement may be provided which ensures that the force needed to move the upper part relative to the intermediate part is greater than that needed to move the lower part relative to the intermediate part. An energy absorbing member may be provided between one or more of the portions to define the force needed to move them. Such members—often called crash strips—are well known in the art. In fact, any telescopic arrangement in which the lower portion will move relative to the intermediate whilst the intermediate portion initially remains fixed to the lower upper portion on initial collapse is envisaged within the scope of the present invention.

The lower portion and the intermediate portion may be adapted to co-operate after a predefined amount of relative movement to prevent further relative movement therebetween such that thereafter the upper portion will start to move relative to the intermediate portion. This may be arranged by providing a stop on the lower portion which is struck by the intermediate portion once it has moved by a predefined distance relative to the lower portion. This defines the amount of collapse in a first collapse phase.

Similarly, the upper portion may also have a stop which limits the amount of permitted movement between the intermediate portion and upper portion during a second collapse phase. The total travel can be controlled by appropriate selection of the relative location of the two stops, the length of the intermediate portion and the initial positioning of the lower portion, intermediate portion and upper portions when in the extended positions.

It is preferred that the stop on the upper portion is defined by an inwardly directed face of the upper portion which is struck by an end of the intermediate portion (or some other protrusion provided thereon for such a purpose).

In a most preferred arrangement the upper portion and lower portion are both tubes with one sliding over the other. The upper tube may be stepped in diameter to define a face which is struck by the end of the intermediate tube when the assembly has reached the fully collapsed position. The intermediate portion may also be a tube. Of course, non-tubular portions may be provided or they may only be tubular for part of their lengths.

In a most convenient arrangement, the lower portion may be arranged such that upon the intermediate portion reaching the end of its travel in the first phase (or preferably at some point in this phase of travel) the lower portion starts to slidingly engage the upper portion at a location spaced from the intermediate portion. This provides additional support to the lower portion which helps prevent the assembly bending under offset loads. It also contributes to the length of the sliding region defined between the upper and lower portions when they collapse.

For example, the step in the upper portion may reduce the inside diameter of the upper portion to a dimension which is substantially equal to that of the outside diameter of the lower portion. The lower tube can therefore enter into and freely slide within the upper portion once the travel between the lower portion and the intermediate portion has been exhausted.

In a most preferred arrangement, the dimensions of the overlapping parts are chosen such that in the first phase of collapse the overlap between the two parts that slide relative to one another always equals or exceeds the minimum overlap specified by a vehicle manufacturer.

The upper portion may support an upper bearing and the lower portion a lower bearing which together support a collapsible steering shaft.

It will of course be understood that the upper portion may slide within the intermediate portion which in turn slides within part of the lower portion. Of course, in an alternative this may be reversed. Also, the lower portion and upper portions may be reversed such that during initial collapse the upper portion moves relative to the intermediate portion whilst the lower portion is fixed relative to the intermediate portion during this initial travel.

An energy absorbing crash strip or other assembly may be provided between the upper and lower portions to resist relative movement of these two parts during collapse. Where provided, the force-travel profile may be stepped such as to take into account the increase in force opposing collapse in the second part of collapse.

Other advantages of this invention will become apparent to those skilled in the art from the following detailed description of the preferred embodiment, when read in light of the accompanying drawings.

There will now be described, by way of example only, one embodiment of the present invention with reference to the accompanying drawings of which:

DETAILED DESCRIPTION OF THE INVENTION

Figure 1:
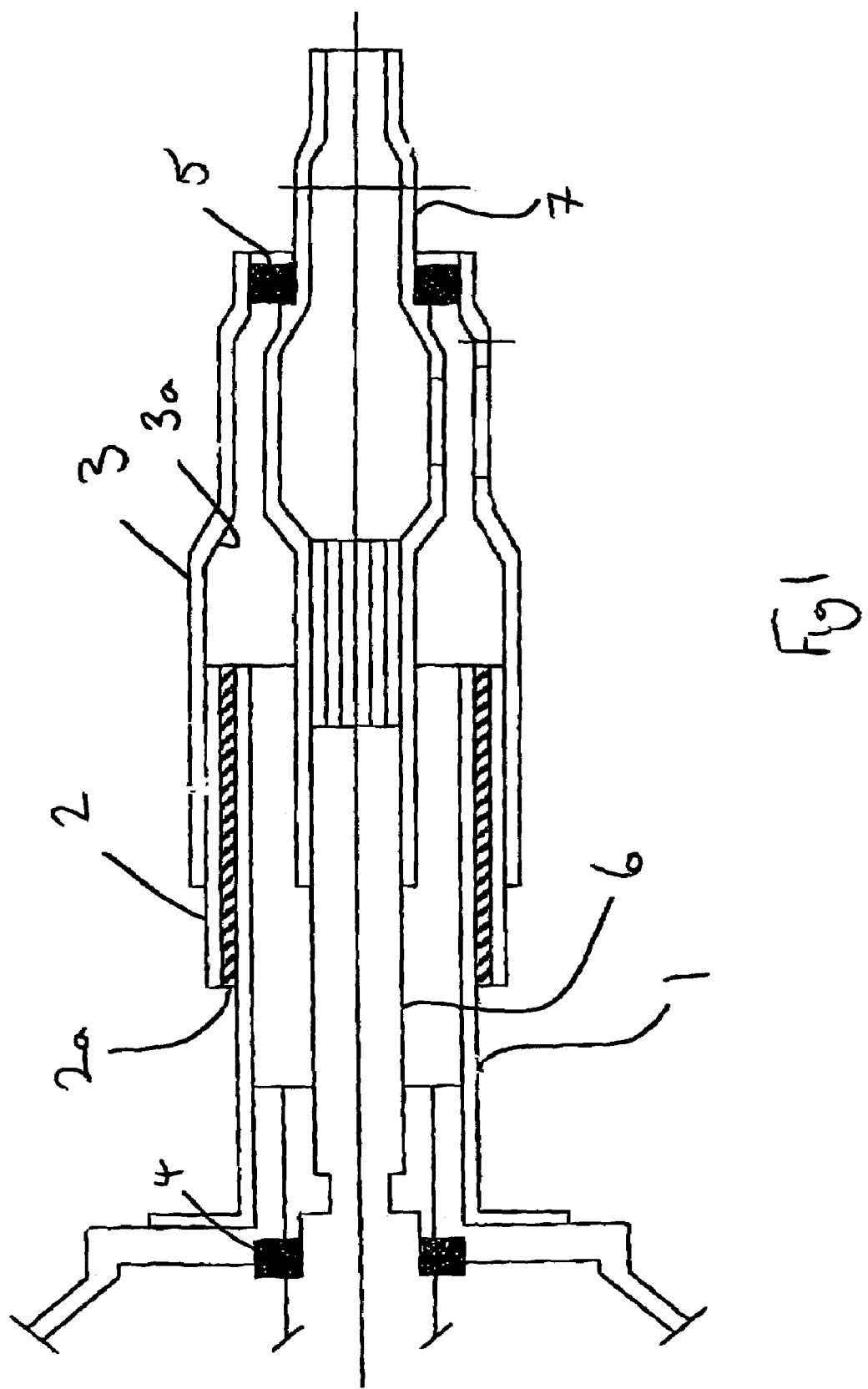
FIG. 1 is a schematic view of a collapsible steering column assembly in accordance with the present invention in a partially collapsed position.

The assembly of FIG. 1, which is shown in an extended position that corresponds to its normal position within a vehicle comprises three telescopic portions. A first, lower section 1, comprises a metal tubular extension to a gearbox casing for an EPAS device. The extension is 165 mm long with the face of the gearbox housing defining a stop on the lower tube. Fitted around an end section of the tubular extension distal from the gearbox is a second, intermediate portion 2 which is also a metal tube. A plastic bush 2a is press-fitted between the lower tube 1 and its surrounding intermediate tube 2. The length of the bush 2a is such as to provide the minimum overlap between the telescoping parts which in this case is 100 mm. The third, upper portion 3, also comprises a metal tube which is press fitted onto the intermediate tube. A force of 2000N is considered suitable for the press-fit force. The upper tube 3 only overlaps the intermediate tube 2 by an amount which is less than the minimum required overlap between sliding parts of 100 mm. In this case the overlap is 65 mm.

The upper portion 3 extends beyond the intermediate portion 2 and lower portions 1 and reduces in diameter at a step 3a approximately 35 mm from the end of the lower portion. The step 3a takes the internal diameter of the upper tube 3 down from an internal diameter equal to the outer diameter of the intermediate tube 2 until it is equal to the outer diameter of the lower tube 1. It is notable that the distance between the end of the upper tube 3 facing the gearbox and the step in diameter is 100 mm (equal to the minimum required overlap of sliding parts).

The upper and lower portions 3,1 support upper and lower annular bearings 4,5 respectively and a two-part collapsible steering shaft 6,7 is supported by these bearings 4,5.

Figure 2:
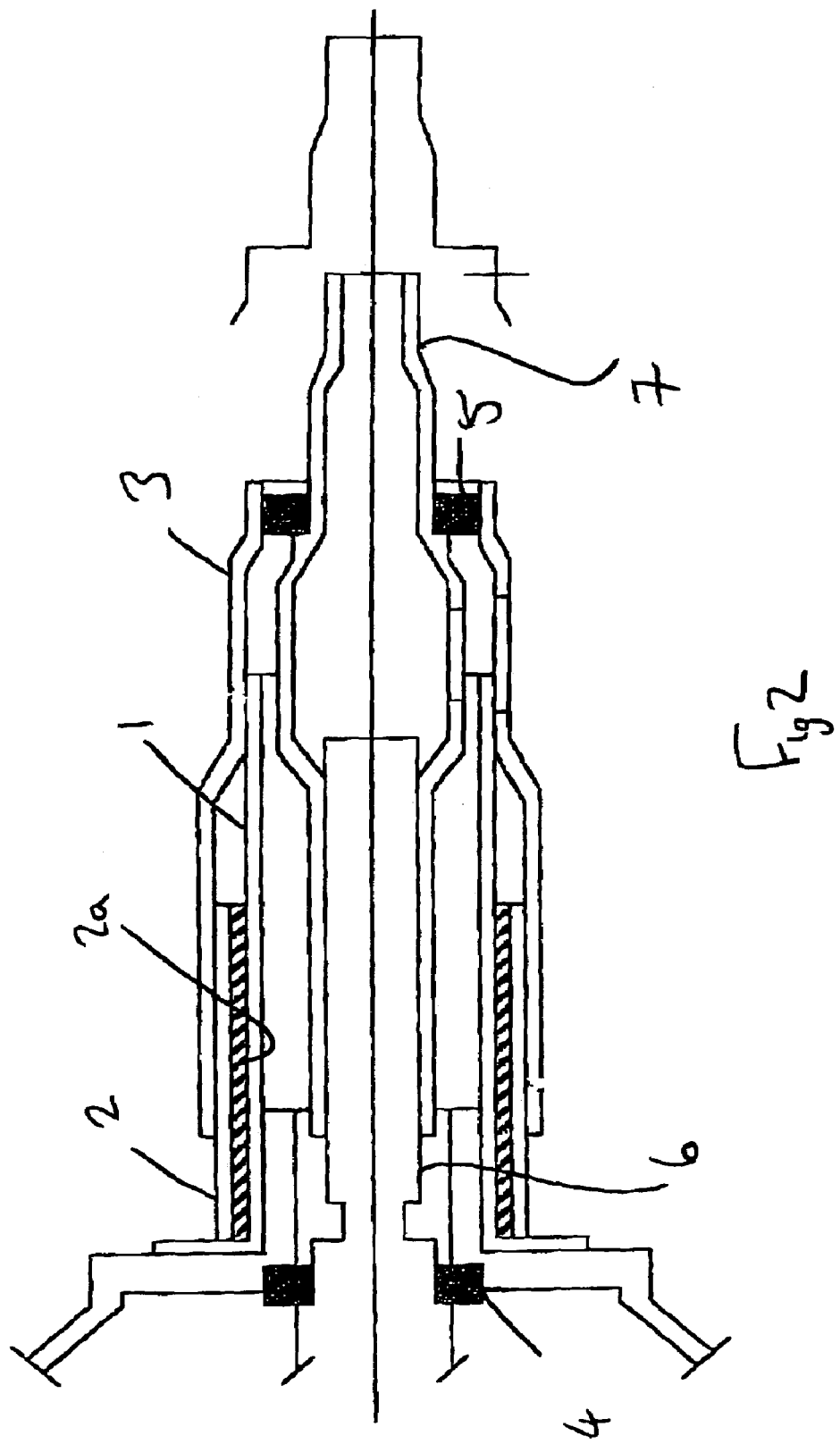
FIG. 2 is a schematic view of a collapsible steering column assembly in accordance with the present invention in a fully collapsed position.
Figure 3:
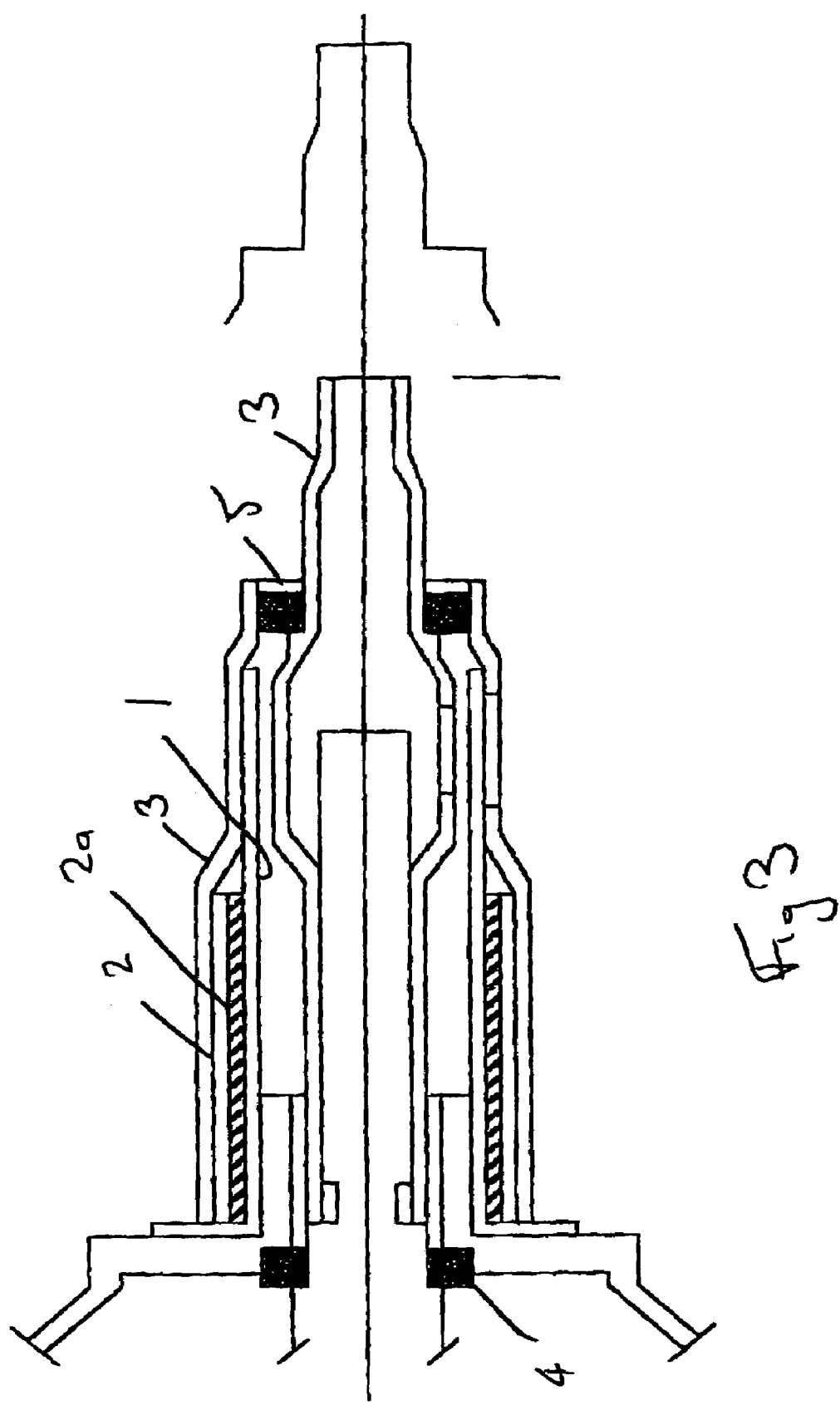
FIG. 3 is a schematic view of a collapsible steering column assembly in accordance with the present invention in an extended position.

FIG. 2 shows the assembly after the first stage of movement towards a collapsed position. This movement would occur when a load is applied to the steering shaft, perhaps as a drivers is thrown forward against a steering wheel (not shown) supported by the shaft 6,7 during an accident. Initially, the lower tube 1 starts to slide within the intermediate tube 2. This is opposed by the low friction generated by the plastic bearing 2a. Movement of the intermediate tube 2 relative to the upper tube 3 does not occur at this time as it is opposed by the larger 2000 Nm press fit force between the two parts. This movement continues until an end face of the intermediate tube 2 hits the step defined by the gearbox housing from which the lower tube 1 projects. The total travel in this first phase is 65 mm, defined by the spacing between the end of the intermediate portion and the stop when in the extended position.

After the stop has been hit by the end of the intermediate tube, corresponding to 65 mm of travel, further collapse is permitted by the relative movement of the upper tubes over the intermediate tubes against the 2000 Nm press-fit friction force. During this motion it is to be noted that the end of the lower tube 1 distal from the gearbox has entered the reduced diameter portion of the upper tube 3 which provides a free sliding engagement. This provides extra support to the lower and upper tubes 1,3. during the second phase. The collapse travel finally ends when the end of the intermediate tube strikes the step formed in the upper tube 3. In the example shown this corresponds to 35 mm of travel in this second phase.

By providing the third tube a greater collapse travel is provided within a given column length. In the embodiment shown, 100 mm of travel is provided from a column length of 265 mm. Additionally, a constant overlap is assured at all times to help resist bending loads. This allows the device to meet requirements for minimum overlap in the sliding portions which in the embodiment is a 100 mm overlap. For a column with just two sliding parts a total of 300 mm of column length would be needed to provided the same travel and overlap at all times.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A collapsible steering column assembly comprising:
   an upper column portion;
   an intermediate column portion; and
   a lower column portion; said upper portion being telescopically connected to said intermediate portion and said intermediate portion in turn being telescopically connected to said lower portion to define a column having a first length when in an extended position and a second length when in a collapsed position, said first length being greater than said second length;
   wherein said lower portion and said intermediate portion are adapted to co-operate after a predefined amount of relative movement to prevent further relative movement therebetween such that thereafter said upper portion will start to move relative to said intermediate portion;
   wherein said upper portion has a stop which limits an amount of permitted movement between said intermediate portion and said upper portion; and
   wherein said stop on said upper portion is defined by an inwardly directed face of said upper portion which is struck by an end of said intermediate portion.

2. A collapsible steering column assembly of claim 1 wherein said upper portion slides relative to said intermediate portion and said intermediate portion slides relative to said lower portion on movement of said assembly between said extended position and said collapsed position.

3. A collapsible steering column assembly of claim 1 wherein said lower portion is connected to said intermediate portion through a low friction engagement.

4. A collapsible steering column assembly according to claim 1 wherein said intermediate portion is a press fit to said upper portion.

5. A collapsible steering column assembly according to claim 1 wherein said connection between said intermediate portion and said upper portion provides greater friction than said connection between said lower portion and said intermediate portion, such that on initial movement between said extended position and said collapsed position said lower portion telescopes relative to said intermediate portion whilst said intermediate portion remains substantially fixed relative to said upper portion.

6. A collapsible steering column assembly according to claim 1 wherein a stop is provided on said lower portion which is struck by said intermediate portion once said intermediate portion has moved by a predefined distance relative to said lower portion.

7. A collapsible steering column assembly according to claim 1 wherein said upper portion and said lower portion are both tubes with one sliding over another, said upper tube being stepped in diameter to define a face which is struck by an end of said intermediate tube when said assembly has reached a fully collapsed position.

8. A collapsible steering column assembly according to claim 1 wherein said lower portion is arranged such that upon said intermediate portion reaching an end of its travel said lower portion starts to slidingly engage said upper portion at a location spaced from said intermediate portion.

9. A collapsible steering column assembly comprising:
   an upper column portion;
   an intermediate column portion; and
   a lower column portion; said upper portion being telescopically connected to said intermediate portion and said intermediate portion in turn being telescopically connected to said lower portion to define a column having a first length when in an extended position and a second length when in a collapsed position, said first length being greater than said second length;
   wherein said lower portion and said intermediate portion are adapted to co-operate after a predefined amount of relative movement to prevent further relative movement therebetween such that thereafter said upper portion will start to move relative to said intermediate portion; and
   wherein said lower portion is arranged such that upon said intermediate portion reaching an end of its travel said lower portion starts to slidingly engage said upper portion at a location spaced from said intermediate portion.

10. A collapsible steering column assembly of claim 9 wherein said upper portion slides relative to said intermediate portion and said intermediate portion slides relative to said lower portion on movement of said assembly between said extended position and said collapsed position.

11. A collapsible steering column assembly of claim 9 wherein said lower portion is connected to said intermediate portion through a low friction engagement.

12. A collapsible steering column assembly according to claim 9 wherein said intermediate portion is a press fit to said upper portion.

13. A collapsible steering column assembly according to claim 9 wherein said connection between said intermediate portion and said upper portion provides greater friction than said connection between said lower portion and said intermediate portion, such that on initial movement between said extended position and said collapsed position said lower portion telescopes relative to said intermediate portion whilst said intermediate portion remains substantially fixed relative to said upper portion.

14. A collapsible steering column assembly according to claim 9 wherein a stop is provided on said lower portion which is struck by said intermediate portion once said intermediate portion has moved by a predefined distance relative to said lower portion.

15. A collapsible steering column assembly according to claim 9 wherein said upper portion has a stop which limits an amount of permitted movement between said intermediate portion and said upper portion.

16. A collapsible steering column assembly according to claim 15, wherein said stop on said upper portion is defined by an inwardly directed face of said upper portion which is struck by an end of said intermediate portion.

17. A collapsible steering column assembly according to claim 9 wherein said upper portion and said lower portion are both tubes with one sliding over another, said upper tube being stepped in diameter to define a face which is struck by an end of said intermediate tube when said assembly has reached a fully collapsed position.

18. A collapsible steering column assembly comprising:
   an upper column portion;
   an intermediate column portion; and
   a lower column portion; said upper portion being telescopically connected to said intermediate portion and said intermediate portion in turn being telescopically connected to said lower portion to define a column having a first length when in an extended position and a second length when in a collapsed position, said first length being greater than said second length;

wherein said lower portion and said intermediate portion are adapted to co-operate after a predefined amount of relative movement to prevent further relative movement therebetween such that thereafter said upper portion will start to move relative to said intermediate portion; and wherein said upper portion and said lower portion are both tubes with one sliding over another, said upper tube being stepped in diameter to define a face which is struck by an end of said intermediate tube when said assembly has reached a fully collapsed position.

19. A collapsible steering column assembly of claim 18 wherein said upper portion slides relative to said intermediate portion and said intermediate portion slides relative to said lower portion on movement of said assembly between said extended position and said collapsed position.

20. A collapsible steering column assembly of claim 18 wherein said lower portion is connected to said intermediate portion through a low friction engagement.

* * * * *